H. PAULING.
ELECTRODE FOR PRODUCING GAS REACTIONS BY MEANS OF THE ELECTRIC ARC.
APPLICATION FILED OCT. 24, 1911.

1,029,885.

Patented June 18, 1912.

Witnesses:
S. V. Caffrey
H. Schoenthal

Inventor:
Harry Pauling
Massie & McElroy
Attys

UNITED STATES PATENT OFFICE.

HARRY PAULING, OF GELSENKIRCHEN, GERMANY, ASSIGNOR TO THE FIRM OF SALPETERSAÜRE-INDUSTRIE-GESELLSCHAFT G. M. B. H., OF COLOGNE, GERMANY.

ELECTRODE FOR PRODUCING GAS REACTIONS BY MEANS OF THE ELECTRIC ARC.

1,029,885.

Specification of Letters Patent.

Patented June 18, 1912.

Application filed October 24, 1911. Serial No. 656,470.

*To all whom it may concern:*

Be it known that I, HARRY PAULING, a subject of the King of Prussia, residing at Gelsenkirchen, in the Kingdom of Prussia and German Empire, have invented new and useful Improvements in Electrodes for Producing Gas Reactions by Means of the Electric Arc, of which the following is a specification.

In the process for producing endothermic gas reactions, especially for producing nitric oxids from the air, horn-shaped electrodes are used, which, in order to obtain more durability, are provided with channels, through which a current of cold water is caused to flow so as to absorb a considerable part of the heat produced. According to the invention the electrodes proper are constructed of three parts, of which the upper and lower parts which come but little in contact with the flame are fixed, while the middle part which is exposed to great heat and is consequently soon burned or worn away, is adapted to be so turned that different sides can be caused to face the flame.

Figure 1:
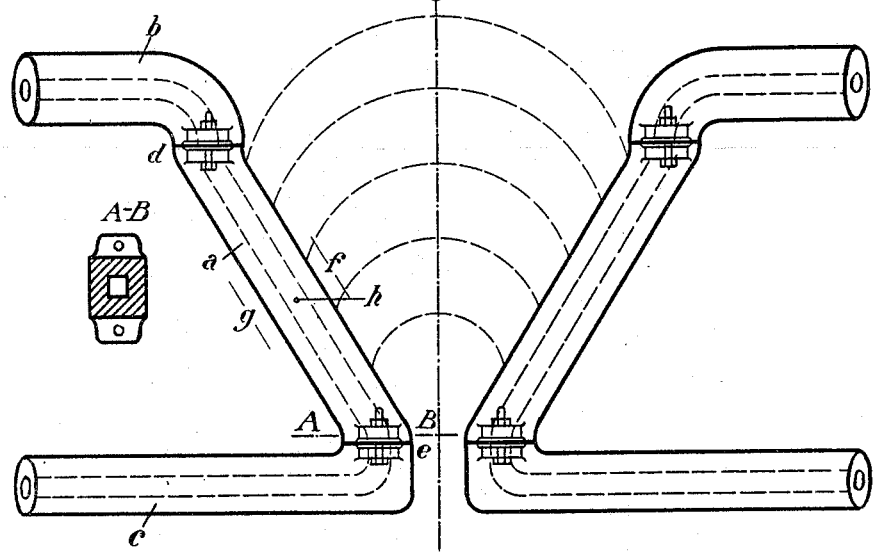
Figure 2:
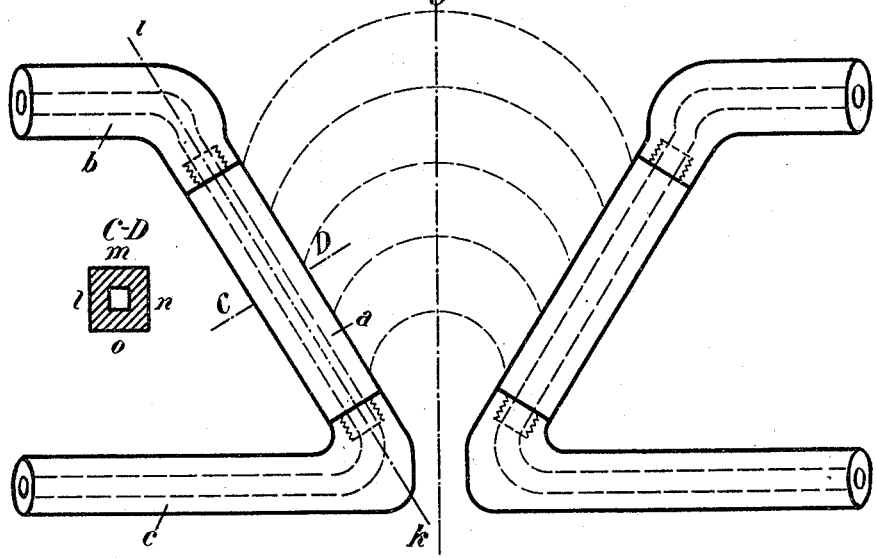

In the drawing Figure 1 is a side elevation of one construction, in which the parts of the electrodes are connected together by flanges or lugs, Fig. 2 is a similar view of a construction, in which the parts of the electrodes are connected by left and right hand screw threaded pins.

The part $a$ (Fig. 1) represents the exchangeable middle part of the electrode, which is fastened to the upper and lower parts $b$, $c$, by means of flanges $d$, $e$. As soon as the surface $f$ has worn away to such an extent that it cannot be used further the electrode is turned about the axis $h$ through 180°, so that then the surface $g$ will face the flame, so that the middle electrode can be used twice as long as heretofore.

In the construction shown in Fig. 2, the middle exchangeable part $a$ of the electrode is so arranged in regard to the upper and lower parts $b$ and $c$ that it can be moved about the axis $i-k$, so that after the surface $l$, for example, has been worn down the surface $m$ can be turned to face the flame, and this operation can be repeated until all four sides $l$, $m$, $n$ and $o$ of the electrode have been utilized. The electrode, owing to its four surfaces being used in this way, can be employed for four times as long as an electrode that cannot be turned. The section C—D can of course be circular and uniform wear can then be obtained around the whole circumference.

The attachment of the middle parts $a$ of the electrodes to the top and bottom parts $b$ and $c$ can be effected by means of any clamping device or by right and left handed screw threads.

What I claim and desire to secure by Letters Patent of the United States is:—

1. A water cooled electrode for producing endothermic gas reactions, comprising in combination, several electrode parts, means to connect said parts together and adapted to enable the part mostly exposed to the heat of the flame to be turned, substantially as, and for the purpose, set forth.

2. A water cooled electrode for producing endothermic gas reactions, comprising in combination, several electrode parts, and means to connect said parts together and adapted to enable the part mostly exposed to the heat of the flame to be turned about its longitudinal axis, substantially as, and for the purpose, set forth.

3. A water cooled electrode for producing endothermic gas reactions, comprising in combination, several electrode parts, clamping devices adapted to connect said parts together and enabling the part mostly exposed to the heat of the flame to be turned, substantially as, and for the purpose, set forth.

In testimony whereof I have signed my name to this specification in the presence of two subscribing witnesses.

HARRY PAULING.

Witnesses:
RICHARD MERKEL,
MARGARETE KÜPPERS.

Copies of this patent may be obtained for five cents each by addressing the "Commissioner of Patents, Washington, D. C."